(12) United States Patent
Mulet et al.

(10) Patent No.: US 9,249,946 B2
(45) Date of Patent: Feb. 2, 2016

(54) ILLUMINATING GLAZING PANEL

(71) Applicant: SAINT-GOBAIN GLASS FRANCE, Courbevoie (FR)

(72) Inventors: Jean-Philippe Mulet, Montreuil (FR); Mathieu Berard, Paris (FR); Fabienne Piroux, Compiegne (FR); Christophe Kleo, Attichy (FR); Adele Verrat-Debailleul, Villers-sur-Coudun (FR); Pascal Bauerle, Roye (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 14/378,286

(22) PCT Filed: Feb. 8, 2013

(86) PCT No.: PCT/FR2013/050270
§ 371 (c)(1),
(2) Date: Aug. 12, 2014

(87) PCT Pub. No.: WO2013/121134
PCT Pub. Date: Aug. 22, 2013

(65) Prior Publication Data
US 2015/0003088 A1  Jan. 1, 2015

(30) Foreign Application Priority Data
Feb. 13, 2012  (FR) ..................... 12 51330

(51) Int. Cl.
*F21S 8/10* (2006.01)
*B29C 45/14* (2006.01)
(Continued)

(52) U.S. Cl.
CPC ........... *F21S 48/30* (2013.01); *B29C 45/14336* (2013.01); *B32B 17/10036* (2013.01);
(Continued)

(58) Field of Classification Search
CPC ............... B29C 45/14336; B29C 45/14377; B29C 45/14467; B29C 67/246; B29K 2075/00; B29L 2031/747; B29L 2031/3481; B32B 17/10036; B32B 17/10541; B60J 1/001; B60J 3/0213; F21K 9/30; F21S 48/30; F21S 48/2212; F21S 48/2243; F21S 48/2268; F21V 11/16; F21V 33/006; E06B 7/00; F21W 2101/00; F21Y 2101/02; F21Y 2103/003; G02B 6/0015; G02B 6/0068; G02B 6/0083; G02B 6/0091; G02B 6/0095
See application file for complete search history.

(56) References Cited

U.S. PATENT DOCUMENTS 8,829,539 B2 *  9/2014  Kleo ................. B32B 17/10018
257/82
9,006,751 B2 *  4/2015  Kleo ................. B32B 17/10036
257/82
(Continued)

FOREIGN PATENT DOCUMENTS

FR  2 937 710  4/2010
FR  2 937 711  4/2010
(Continued)

OTHER PUBLICATIONS

International Search Report issued for International Application No. PCT/FR2013/050270, dated Apr. 3, 2013.

*Primary Examiner* — Stephen F Husar
(74) *Attorney, Agent, or Firm* — Pillsbury Winthrop Shaw Pittman LLP

(57) ABSTRACT

An illuminating glazing unit includes a first sheet having a first main face, a second main face and an edge face; a second sheet having a first main face, a second main face and an edge face; a lamination interlayer having an extent smaller than that of each of the glass sheets and defining a space between the edge of the second main face of the first sheet and the edge of the first main face of the second sheet; a strip of LEDs, including a printed circuit board and a plurality of LEDs, positioned so that the emitting faces of the LEDs face the edge face of the first sheet; and an encapsulating element made of an opaque polymer encapsulating at least the edge face of the second sheet and the LED strip. The PCB bears against the first main face of the second glass sheet with a plurality of spacers and the space is filled by the opaque polymer.

18 Claims, 2 Drawing Sheets

(51) Int. Cl.
  F21K 99/00    (2010.01)
  B60Q 1/26     (2006.01)
  B60Q 3/02     (2006.01)
  B60J 1/00     (2006.01)
  E06B 7/00     (2006.01)
  F21V 11/16    (2006.01)
  B32B 17/10    (2006.01)
  F21Y 101/02   (2006.01)
  F21V 33/00    (2006.01)
  F21Y 103/00   (2006.01)
  F21V 8/00     (2006.01)
  B29K 75/00    (2006.01)
  B29L 31/34    (2006.01)
  B29L 31/00    (2006.01)
  F21W 101/00   (2006.01)
  B29C 67/24    (2006.01)

(52) U.S. Cl.
  CPC ........... *B32B17/10541* (2013.01); *B60J 1/001* (2013.01); *B60Q 1/268* (2013.01); *B60Q 3/0213* (2013.01); *E06B 7/00* (2013.01); *F21K 9/30* (2013.01); *F21S 48/2212* (2013.01); *F21S 48/2243* (2013.01); *F21S 48/2268* (2013.01); *F21V 11/16* (2013.01); *G02B 6/0015* (2013.01); *G02B 6/0083* (2013.01); *G02B 6/0091* (2013.01); *B29C 45/14377* (2013.01); *B29C 45/14467* (2013.01); *B29C 67/246* (2013.01); *B29K 2075/00* (2013.01); *B29L 2031/3481* (2013.01); *B29L 2031/747* (2013.01); *F21V 33/006* (2013.01); *F21W 2101/00* (2013.01); *F21Y 2101/02* (2013.01); *F21Y 2103/003* (2013.01); *G02B 6/0068* (2013.01); *G02B 6/0095* (2013.01)

(56) References Cited

U.S. PATENT DOCUMENTS

2014/0362597 A1* 12/2014 Verrat-Debailleul .. B60Q 1/268 362/511
2015/0247968 A1* 9/2015 Verrat-Debailleul  G02B 6/0088 362/612

FOREIGN PATENT DOCUMENTS

| FR | 2 955 530    | 7/2011  |
| WO | WO 95/01493  | 1/1995  |
| WO | WO 00/77336  | 12/2000 |

* cited by examiner

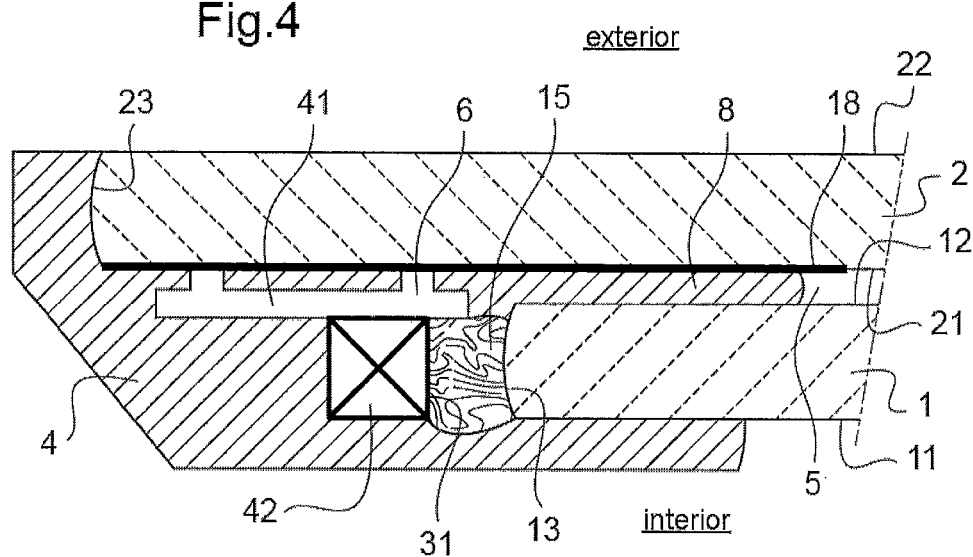
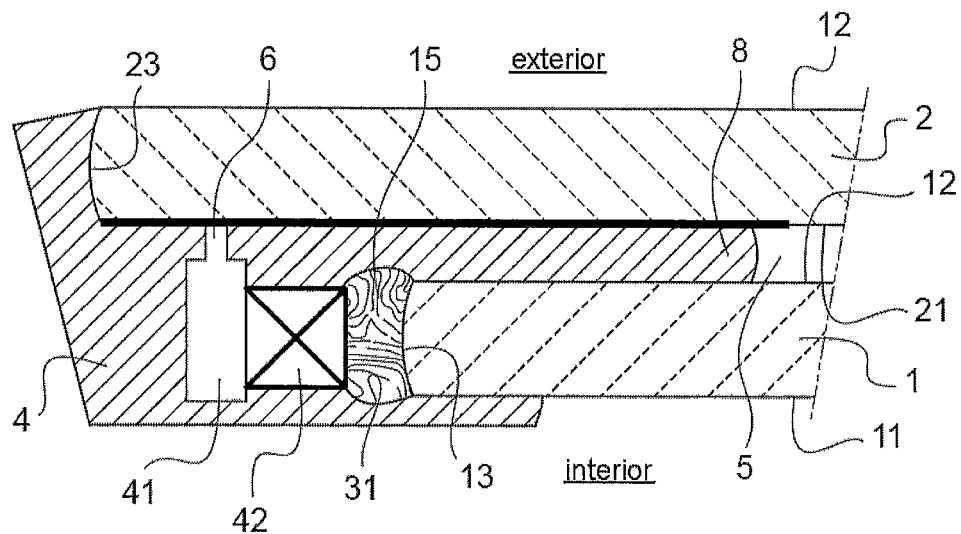

ILLUMINATING GLAZING PANEL

CROSS REFERENCE TO RELATED APPLICATIONS

This application is the U.S. National Stage of PCT/FR2013/050270, filed Feb. 8, 2013, which in turn claims priority to French Application No. 1251330, filed Feb. 13, 2012. The contents of all of these application are incorporated herein by reference in their entirety.

The present invention relates to a glazing unit, preferably a vehicle glazing unit, illuminated via its edge face by means of light-emitting diodes and comprising a rather simple, but effective system for masking parasitic light produced by these diodes.

Glazing units, and in particular automotive-vehicle glazing units, illuminated by their edge face by means of light-emitting diodes (LEDs), are known, In the case of laminated glazing units, these LEDs inject light into at least one of the two glass sheets, which then functions as a waveguide, guiding the light as far as a means (scattering element) for extracting the light, which means is located a certain distance from the edge of the glazing unit.

The intensity of the light emitted by the Lambertian emitting face of the LED is generally very high, and the light is emitted therefrom over about 180°. For esthetic reasons, it is generally desired to mask the LEDs in order to keep them from being seen by people nearby. There are various means for blocking this direct light from the LEDs (this light being called parasitic light below):

- the encapsulating means, which is generally formed from an opaque polymer (polyurethane filled with carbon black), may cover the edge of the glazing unit and, providing it is sufficiently thick, effectively block the parasitic light; however, this means cannot be used in what are called "flush mount" glazing units where the encapsulation covers the edge face of the sheet but does not extend beyond the latter significantly;
- a masking enamel may be applied either to the border of the illuminated sheet, or to the border of the unilluminated sheet which is adhesively bonded to the illuminated sheet via a transparent lamination interlayer; however, the thickness of such an enamel is limited to a few microns, which is often insufficient for effective masking;
- lastly, the printed circuit board on which the LEDs are mounted may screen the light; its light-blocking power and/or its extent are however generally insufficient to perfectly mask the parasitic light.

FIG. 1, described in more detail below, shows a laminated flush mount glazing unit according to the prior art, in which the parasitic light is blocked on the interior side by the encapsulating element and toward the exterior by an insufficiently opaque masking enamel. As a result, residual spots of light are visible from the exterior, as shown in FIG. 2.

The idea behind the present invention is to mask the parasitic light by allowing the opaque polymer forming the encapsulating element to penetrate into a relatively deep groove located between the two glass sheets. This groove is defined between the two glass sheets by the lamination interlayer, which has a smaller extent than each of the adhesively bonded sheets. The greater the size difference between the lamination interlayer and the glass sheets, the deeper the groove.

So that the opaque encapsulating polymer can easily penetrate into this deep groove-shaped space and fill it without forming voids, the LED strip, bearing against one of the two glass sheets, must not obstruct the flow of the liquid encapsulating composition during the injection step. Provision is therefore made, in the present invention, for the printed circuit board (PCB) to comprise a plurality of "spacers" on its edge or on that surface via which it bears against the glass sheet. These "spacers" or pads establish a multi-point contact between the PCB and the glazing unit and allow, during the encapsulating step, the liquid encapsulating composition to pass between the PCB and the glass sheet against which it bears.

One subject of the present invention is therefore an insulating glazing unit, comprising:
- a first sheet, made of mineral or organic glass, having a first main face, a second main face and an edge face;
- a second sheet, made of mineral or organic glass, having a first main face, a second main face and an edge face;
- a lamination interlayer, making adhesive contact with the second main face of the first sheet and with the first main face of the second sheet, said lamination interlayer having an extent smaller than that of each of the glass sheets and thus defining a groove-shaped space between the edge of the second main face of the first sheet and the edge of the first main face of the second sheet;
- at least one strip of light-emitting diodes (LEDs), comprising a printed circuit board (PCB) and a plurality of LEDs, positioned so that the emitting faces of the LEDs face the edge face of the first sheet; and
- an encapsulating element made of an opaque polymer encapsulating at least the edge face of the second sheet and the LED strip, characterized in that the PCB bears against the first main face of the second glass sheet by way of a plurality of spacers, and in that the groove-shaped space is filled by the opaque polymer of the encapsulating element.

The glazing unit of the present invention is a laminated glazing unit comprising at least two single sheets adhesively bonded to each other in a known way by means of a lamination interlayer. It is important to note that, in the following description of the glazing unit, the term "first sheet" will always denote the glass sheet illuminated via its edge face by the one or more light sources. The first sheet, or the illuminated sheet, is preferably the sheet that makes contact with the interior of the vehicle or building.

Each of the two sheets of the glazing unit of the present invention has an edge face and two main faces. The face intended to be oriented toward the interior of the passenger compartment or of the building will be called the first main face, and the face intended to be directed towards the exterior of the building or of the passenger compartment of the vehicle will be called the second main face.

The second sheet is preferably of larger extent than the first sheet, and extends beyond the latter at least on the edge of the glazing unit where the strips of LEDs are located. In this preferred embodiment of the invention, the strips bear, by way of the spacers, against the first main surface of the second sheet.

The spacers may be located on the edge face of the PCB, as in the embodiment shown in FIG. 5, but they are preferably located on the face of the PCB opposite that on which the LEDs are fixed, as shown in FIGS. 3 and 4 below. In the latter case, the LED strips are side-emitting LED strips, whereas in FIG. 4 they are top-emitting LED strips.

To ensure the PCB is well seated on the second sheet during the phase of injecting the encapsulating composition, and to guarantee that the PCB board preserves an orientation parallel to the main plane of the glazing unit, the spacers are preferably placed in a plane, i.e. they are not aligned only along a single straight line. Specifically, if the spacers were positioned only in a single straight line on the PCB, it would then be possible for the PCB to pivot about this bearing axis, and this could lead to an uncontrolled and undesirable modification of the direction in which the light is injected into the first sheet.

It is possible to obtain a good PCB stability by aligning the spacers along two straight lines, parallel to each other and preferably parallel to the edge of the PCB and to the edge of the second sheet.

Preferably, the spacers are at least equal to the LEDs in number, and are regularly distributed over the PCB, each LED preferably being associated with at least one spacer located in immediate proximity thereto. The periodicity of the intervals between spacers preferably reflects the spacing between the LEDs. In particular, for flexible PCBs it is important for a spacer to be located under each LED in order to guarantee they are held in place satisfactorily.

In a particularly advantageous embodiment of the present invention, shown in FIG. 3, the PCB extends into the space defined by the lamination interlayer between the first and second sheet. Specifically, this embodiment corresponds to a particularly compact and stable solution in which the PCB, housed between the two glass sheets, is moreover sheltered from possible mechanical stresses.

As explained in more detail below, the liquid encapsulating composition, formed by a mixture of thermosetting monomers, must penetrate, during the encapsulating operation, into the free space between the two sheets by passing through the thin air layer created by the spacers between the PCB and the first main face of the second sheet. In order for the flow of the material during this injection phase not to be obstructed, the air layer between the PCB and the second sheet must be sufficiently thick. This thickness corresponds to the relief, i.e. to the height, of the spacers. It is preferably comprised between 200 and 1000 µm, and in particular between 400 and 700 µm. The spacers may incidentally serve to adjust the position of the emitting face of the LEDs with respect to the edge face of the first sheet. For this purpose, and if necessary, they may then be greater than 1 mm in height.

The relief of the spacers must not be confused with the total thickness of the parasitic-light-masking layer that will be formed between the two glass sheets on the border of the glazing unit. The thickness of the masking layer will essentially be defined by the gap between the two glass sheets, or in other words by the thickness of the lamination interlayer. In order to provide sufficient opacity, the space between the two glass sheets, filled by the opaque polymer of the encapsulating element, preferably has a thickness comprised between 0.2 and 2 mm, and in particular between 0.3 and 1.5 mm.

It is important to specify not only the thickness but also the width of the opaque strip of encapsulating polymer (which corresponds to the depth of the groove defined by the lamination interlayer and the two sheets). This width is preferably comprised between 0.2 cm and 2.0 cm, and in particular between 0.3 and 1.0 cm. When the glazing unit comprises two sheets of different sizes, one extending beyond the other at least on the edges where the light sources are located, the depth of the groove is defined as the distance separating the edge of the interlayer from the edge of the smaller sheet.

The glazing unit of the present invention furthermore advantageously comprises an opaque enamel applied to the edge of the first main face of the second sheet, i.e. level with the zone of contact between the second sheet and the spacers of the PCB. This enamel has the double function of esthetically masking this zone of contact and of reinforcing the light-blocking power of the polymer encapsulating layer when the latter is relatively thin. This enamel coating must of course be of a sufficient extent to mask the space filled by the opaque polymer of the encapsulating element, and must therefore extend at least as far as, or even beyond, the edge of the lamination interlayer.

In the glazing unit of the present invention, a large part of the surface of the LED strips makes contact with the polymer of the encapsulating element, which is generally a rather good thermal insulator. This may undesirably hinder the evacuation of heat generated, in operation, by the LEDs and other components of the PCB. The spacers may, in certain cases, be the only points of contact of the PCB with one of the glass sheets, and they then play an important role as thermal bridges. In order to promote evacuation of heat and limit heating of the PCB, the spacers are advantageously made of a material that is a good thermal conductor, in particular a material having a thermal conductivity $\lambda$ at least equal to 200 W/mK, and preferably at least equal to 230 W/mK.

For example, the spacers may be made of a metal, such as aluminum and aluminum alloys, or indeed they may form an integral part of the PCB and be made of the same material as the latter.

As mentioned in the introduction, the glazing unit of the present invention is preferably a "flush mount" glazing unit, which means that the second main face of the second sheet, intended to make contact with the exterior of the vehicle or building, is not covered by the encapsulating element which only covers the edge face of the second glass sheet.

Another subject of the present invention is a process for manufacturing an illuminating glazing unit such as described above. This process comprises at least the following steps in succession:

(a) providing a laminated glazing unit, comprising:
  a first sheet, made of mineral or organic glass, having a first main face, a second main face and an edge face;
  a second sheet, made of mineral or organic glass, having a first main face, a second main face and an edge face;
  a lamination interlayer, making adhesive contact with the second main face of the first sheet and with the first main face of the second sheet, said lamination interlayer having an extent smaller than that of each of the glass sheets and thus defining a groove-shaped space between the edge of the second main face of the first sheet and the edge of the first main face of the second sheet;

(b) positioning at least one strip of LEDs comprising a printed circuit board (PCB) and a plurality of LEDs, so that the emitting faces of the LEDs face the edge face of the first sheet, and so that the PCB bears against the first main face of the second glass sheet by way of a plurality of spacers; and (c) forming an encapsulating element made of an opaque polymer, encapsulating at least the edge face of the second sheet, and the LED strip, and filling the groove-shaped space between the edge of the second main face of the first sheet and the edge of the first main face of the second sheet.

The one or more LED strips may be fixed in place by adhesive bonding. It is particularly advantageous to ensure optical coupling between the emitting faces of the LEDs and the edge face of the first sheet with a transparent adhesive that will furthermore make it possible to prevent, during step (c), the encapsulating composition from obstructing and darkening the zone between the LEDs and the edge face of the first sheet.

The encapsulating element is formed (step (c)) by injecting a liquid encapsulating composition into a mould surrounding the edge of the glazing unit. This encapsulating composition may be a composition of thermosetting monomers, preferably a composition comprising at least one polyisocyanate and a polyol (forming a polyurethane), and heating said injected composition to a temperature and for a sufficient amount of time to cause it to set.

The composition may be a thermoplastic in the molten state. The setting is then caused not by heating the polymer but by cooling it.

The conditions of injection and setting of the encapsulating composition, and various thermosetting or thermoplastic encapsulating composition formulations, are known. A person skilled in the art will be able to choose them and, if necessary, adapt them in order to obtain a satisfactory filling of the space between the edges of the two glass sheets, to create a sufficiently opaque polymer strip and thus to hide any parasitic light.

The present invention is now illustrated using a few embodiments shown in the figures below, in which:

FIG. 4 shows the edge of a second embodiment of a glazing unit according to the invention; and FIG. 5 shows the edge of a third embodiment of a glazing unit according to the invention.

Figure 1:
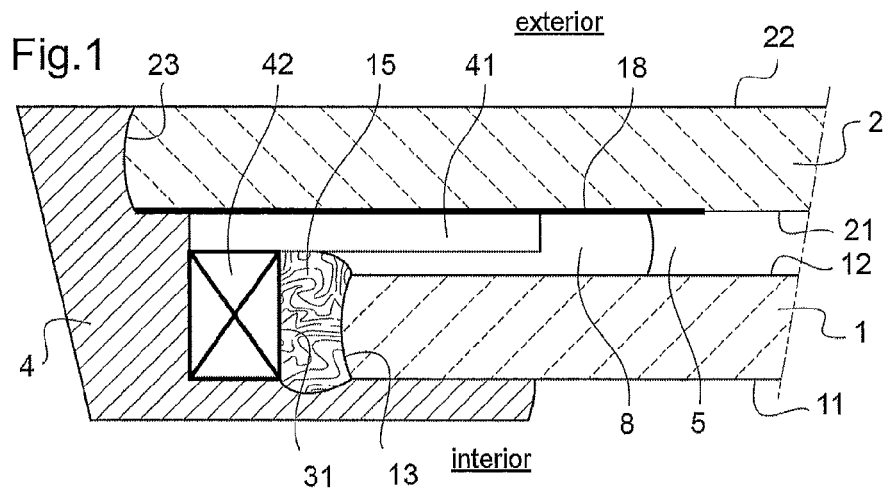
FIG. 1 shows a transverse cross section of the edge of a prior-art, LED-illuminated, laminated glazing unit.

The laminated glazing unit in FIG. 1 comprises a first glass sheet 1 with a first main face 11, a second main face 12, and an edge face 13 via which an LED 42 supported by a PCB 41 injects light into the first sheet. The lamination interlayer 5, making adhesive contact with the first main surface 21 of the second sheet and the second main surface 12 of the first sheet, is of smaller extent than the two glass sheets 1, 2, and thus defines a groove-shaped space 8 between these two sheets. The emitting surface 31 of the LED 42 is optically coupled to the edge face 13 of the first sheet by a transparent adhesive 15. The PCB 41 is adhesively bonded directly to the first main surface of the second sheet. The encapsulating element 4 cannot therefore penetrate into the space 8 between the two sheets, and only makes contact with the edge face 23 of the second sheet, a part of the LED 42, the adhesive 15, and the first main surface 11 of the first sheet.

The encapsulating element 4 making contact with the first main face 11 of the first sheet blocks any parasitic light liable to be emitted toward the interior.

An opaque enamel 18 applied to the first main surface 21 of the second sheet masks this zone of contact between the PCB and the sheet 2, with respect to the exterior. The combined light-blocking power of this enamel 18 and of the PCB 41 is sufficient to block emission of direct light from the LED toward the exterior. However, beyond the PCB 41, the light-blocking power of the enamel alone is insufficient to screen the parasitic light.

Figure 2:
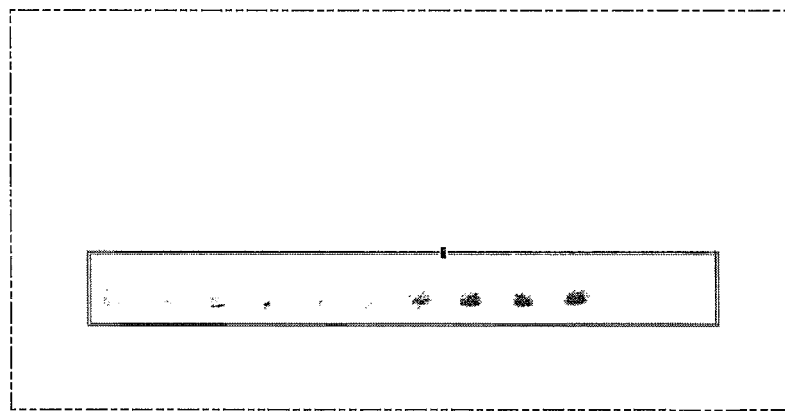
FIG. 2 is the negative of a photograph taken with a video photometer, showing residual light spots (parasitic light) observed for the glazing unit in FIG. 1.

FIG. 2 shows the negative of a photograph, taken with a video photometer, of the glazing unit in FIG. 1 seen from the exterior. Each dark point in this figure corresponds to a spot of parasitic light, from an LED, having passed through the enamel 18.

Figure 3:
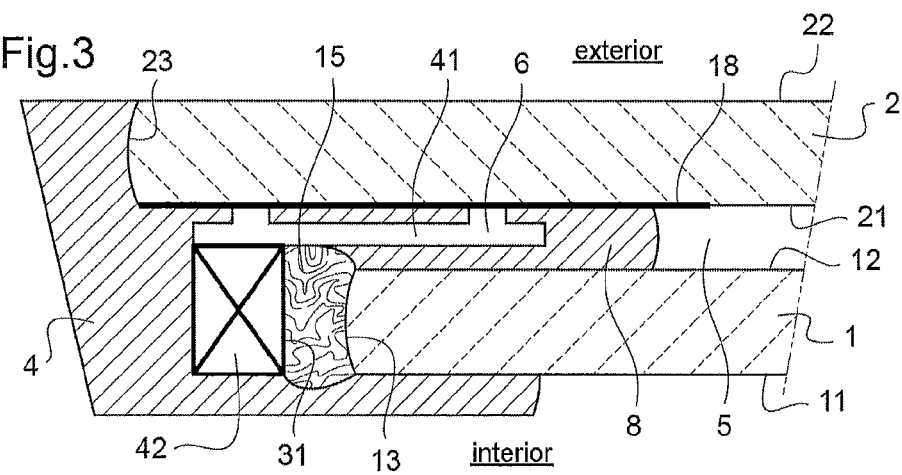
FIG. 3 shows a transverse cross section of the edge of a first embodiment of a glazing unit according to the invention.

FIG. 3 shows a first embodiment of a glazing unit according to the present invention. Comparison with FIG. 1 shows that the essential difference of this glazing unit resides in the presence of spacers 6 holding the PCB 41 a certain distance from the first main surface 21 of the second sheet. By virtue of the space thus defined between the PCB 41 and the second sheet 2, the liquid composition forming the encapsulating element 4 can penetrate, during the encapsulating step, via this space, into the groove-shaped space 8 defined by the two sheets 1, 2 and the interlayer 5. Filling this space 8 with the polymer of the encapsulating element provides an additional level of opaqueness that effectively suppresses the parasitic light.

FIG. 4 shows a second embodiment of the glazing unit according to the invention, which differs from that shown in FIG. 3 in that the PCB 41 does not extend into the groove-shaped space 8 defined by the two sheets 1, 2 and the interlayer 5. This embodiment is useful, for example, when the thickness of the PCB 41 is larger than or equal to the thickness of the interlayer, and when it is impossible to insert said PCB 41 into the space 8.

Lastly, FIG. 5 shows a third embodiment of the glazing unit according to the invention, in which the side-emitting LED strip in FIGS. 3 and 4 has been replaced by a top-emitting LED strip. The spacers 6, only one of which can be seen here in cross section, are located not on a main surface of the PCB 41 but on the edge face of the latter.

The invention claimed is:

1. An illuminating glazing unit, comprising;
   a first sheet, made of mineral or organic glass, having a first main face, a second main face and an edge face;
   a second sheet, made of mineral or organic glass, having a first main face, a second main face and an edge face;
   a lamination interlayer, making adhesive contact with the second main face of the first sheet and with the first main face of the second sheet, said lamination interlayer having an extent smaller than that of each of the first and second glass sheets and thus defining a groove-shaped space between an edge of the second main face of the first sheet and an edge of the first main face of the second sheet;
   at least one strip of light-emitting diodes, comprising a printed circuit board and a plurality of light-emitting diodes, positioned so that the emitting faces of the light-emitting diodes face the edge face of the first sheet; and
   an encapsulating element made of an opaque polymer encapsulating at least the edge face of the second sheet and the at least one strip of light-emitting diodes, wherein the printed circuit board bears against the first main face of the second glass sheet by way of a plurality of spacers and wherein the groove-shaped space is filled by the opaque polymer of the encapsulating element.

2. The illuminating glazing unit as claimed in claim 1, wherein the second sheet is of larger extent than the first sheet and extends beyond the latter at least on an edge of the glazing unit where the at least one strip of light-emitting diodes is located.

3. The illuminating glazing unit as claimed in claim 1 wherein the printed circuit board extends into the groove-shaped space defined by the lamination interlayer between the first and second sheet.

4. The illuminating glazing unit as claimed in claim 1 further comprising an opaque enamel applied to the edge of the first main face of the second sheet, said enamel being of sufficient extent to mask the groove-shaped space filled by the opaque polymer of the encapsulating element.

5. The illuminating glazing unit as claimed in claim 1 wherein the groove-shaped space filled by the opaque polymer of the encapsulating element has a thickness comprised between 0.2 and 2 mm, and a depth comprised between 0.2 cm and 2 cm.

6. The illuminating glazing unit as claimed in claim 1 wherein the spacers are placed in order not to be aligned only on a single straight line.

7. The illuminating glazing unit as claimed in claim 1 wherein the spacers are aligned along two straight lines, parallel to each other.

8. The illuminating glazing unit as claimed in claim 1 wherein a height of the spacers is comprised between 200 and 1000 μm.

9. The illuminating glazing unit as claimed in claim 1 wherein the spacers are made of a material having a thermal conductivity λ at least equal to 200 W/mK.

10. The illuminating glazing unit as claimed in claim 1 wherein the spacers are made of a metal.

11. The illuminating glazing unit as claimed in claim 1 wherein the spacers are an integral part of the printed circuit board and are made of the same material as the latter.

12. A process for manufacturing an illuminating glazing unit according to claim 1, comprising in succession:
- providing a laminated glazing unit, comprising:
  - a first sheet, made of mineral or organic glass, having a first main face, a second main face and an edge face;
  - a second sheet, made of mineral or organic glass, having a first main face, a second main face and an edge face;
  - a lamination interlayer, making adhesive contact with the second main face of the first sheet and with the first main face of the second sheet, said lamination interlayer having an extent smaller than that of each of the first and second glass sheets and thus defining a groove-shaped space between an edge of the second main face of the first sheet and an edge of the first main face of the second sheet;
- positioning at least one strip of light-emitting diodes comprising a printed circuit board and a plurality of light-emitting diodes, so that emitting faces of the light-emitting diodes face the edge face of the first sheet, and so that the printed circuit board bears against the first main face of the second glass sheet by way of a plurality of spacers; and
- forming an encapsulating element made of an opaque polymer encapsulating at least the edge face of the second sheet, and the at least one strip of light-emitting diodes, and filling the groove-shaped space between the edge of the second main face of the first sheet and the edge of the first main face of the second sheet.

13. The process as claimed in claim 12, wherein the forming comprises injecting, into a mould surrounding an edge of the glazing unit, a composition of thermosetting monomers, and heating said injected composition to a temperature and for a sufficient amount of time to cause it to set.

14. The illuminating glazing unit as claimed in claim 5, wherein the thickness is comprised between 0.3 and 1.5 mm and the depth is comprised between 0.3 cm and 1.0 cm.

15. The illuminating glazing unit as claimed in claim 7, wherein the two straight lines are parallel to the edge of the printed circuit board and to the edge of the second sheet.

16. The illuminating glazing unit as claimed in claim 8, wherein the height of the spacers is comprised between 400 and 700 μm.

17. The illuminating glazing unit as claimed in claim 9, wherein the thermal conductivity λ is at least equal to 230 W/mK.

18. The process as claimed in claim 13, wherein the composition comprises at least one polyisocyanate and a polyol.

* * * * *